(12) United States Patent
Oka

(10) Patent No.: US 8,510,855 B2
(45) Date of Patent: Aug. 13, 2013

(54) IMAGE DISTRIBUTION APPARATUS AND METHOD OF CONTROLLING THE SAME, IMAGE TRANSMISSION APPARATUS AND METHOD OF CONTROLLING THE SAME, WHICH ARE EXCELLENT IN USER LOCATION INFORMATION SECURITY, AND STORAGE MEDIUM

(75) Inventor: Hiroto Oka, Machida (JP)

(73) Assignee: Canon Kabushiki Kaisha (JP)

( * ) Notice: Subject to any disclaimer, the term of this patent is extended or adjusted under 35 U.S.C. 154(b) by 68 days.

(21) Appl. No.: 13/176,853

(22) Filed: Jul. 6, 2011

(65) Prior Publication Data

US 2012/0011593 A1  Jan. 12, 2012

(30) Foreign Application Priority Data

Jul. 7, 2010 (JP) .................................. 2010-154640
Jul. 4, 2011 (JP) .................................. 2011-148112

(51) Int. Cl.
G06F 21/24 (2006.01)
G08B 1/08 (2006.01)

(52) U.S. Cl.
USPC .............. 726/27; 396/661; 386/277; 340/8.1; 340/539.13

(58) Field of Classification Search
None
See application file for complete search history.

(56) References Cited

U.S. PATENT DOCUMENTS

| | | | |
|---|---|---|---|
| 7,103,472 B2 * | 9/2006 | Itabashi ........................ 701/420 |
| 7,224,987 B1 * | 5/2007 | Bhela et al. ................. 455/456.3 |
| 7,570,283 B2 * | 8/2009 | Sato et al. ................... 348/211.4 |
| 7,734,315 B2 * | 6/2010 | Rathus et al. .............. 455/569.2 |
| 7,751,826 B2 * | 7/2010 | Gardner et al. ............. 455/456.1 |
| 7,782,365 B2 * | 8/2010 | Levien et al. .............. 348/220.1 |
| 7,907,180 B2 * | 3/2011 | Takayama .................. 348/211.8 |
| 7,987,140 B2 * | 7/2011 | Bellwood et al. ................. 705/59 |
| 8,095,991 B2 * | 1/2012 | Bellwood et al. ................. 726/30 |
| 8,185,959 B2 * | 5/2012 | Bellwood et al. ................. 726/26 |
| 8,237,806 B2 * | 8/2012 | Tanaka et al. ............. 348/211.99 |
| 8,265,871 B1 * | 9/2012 | Starns et al. .................. 701/451 |
| 8,266,716 B2 * | 9/2012 | Bellwood et al. ................. 726/30 |
| 8,331,611 B2 * | 12/2012 | Johnson et al. ................. 382/100 |
| 8,340,726 B1 * | 12/2012 | Fujisaki ........................ 455/566 |
| 8,416,989 B2 * | 4/2013 | Hirasawa ...................... 382/103 |
| 2003/0151669 A1 * | 8/2003 | Robins et al. ............. 348/207.99 |
| 2006/0028558 A1 * | 2/2006 | Sato et al. ................. 348/211.99 |
| 2010/0141778 A1 * | 6/2010 | Basson et al. ................ 348/207.1 |
| 2011/0007134 A1 * | 1/2011 | Knize et al. .................... 348/43 |
| 2011/0181470 A1 * | 7/2011 | Qiu et al. ...................... 342/417 |
| 2011/0227699 A1 * | 9/2011 | Seth et al. ...................... 340/8.1 |
| 2012/0004950 A1 * | 1/2012 | Julian et al. .................. 705/7.32 |

FOREIGN PATENT DOCUMENTS

JP  2005-339214 A  12/2005

* cited by examiner

*Primary Examiner* — Christopher Revak
(74) *Attorney, Agent, or Firm* — Rossi, Kimms & McDowell LLP

(57) ABSTRACT

An image distribution apparatus capable of preventing a third party from knowing that a photographer is away from a specific place, based on information indicative of shooting date and time or a shooting location, which is stored in a manner associated with an image shot by the photographer. A blog server receives an image from an camera-equipped cellular phone. The image has location information added thereto which is indicative of a location where the cellular phone existed during shooting processing of the image. The blog server stores the image, and determines whether a location indicated by the location information is within a predetermined area. The blog server permits distribution of the image via a network if the location is determined to be within the predetermined area, but inhibits distribution of the image if the location is not determined to be within the predetermined area.

15 Claims, 16 Drawing Sheets

FIG.6

| TEXT FILE PATH | IMAGE FILE PATH | IMAGE LOCATION INFORMATION | PUBLIC VIEW |
|---|---|---|---|
| ·····/20090227.doc | ·····/cat.jpg | (136,45) | Yes |
| ·····/20090310.doc | ·····/airplane.jpg | (45,60) | No |
| ... | ... | ... | ... |
| ... | ... | ... | ... |

FIG.14

| IMAGE FILE PATH | CAMERA AREA INFORMATION | PUBLIC VIEW |
|---|---|---|
| ·····/cat.jpg | WITHIN DISTRIBUTION PERMITTING AREA | Yes |
| ·····/airplane.jpg | OUTSIDE DISTRIBUTION PERMITTING AREA | No |
| ··· | ··· | ··· |
| ··· | ··· | ··· |

IMAGE DISTRIBUTION APPARATUS AND METHOD OF CONTROLLING THE SAME, IMAGE TRANSMISSION APPARATUS AND METHOD OF CONTROLLING THE SAME, WHICH ARE EXCELLENT IN USER LOCATION INFORMATION SECURITY, AND STORAGE MEDIUM

BACKGROUND OF THE INVENTION

1. Field of the Invention

The present invention relates to AN image management technique for managing and distributing digital images.

2. Description of the Related Art

Through the use of a communication network, an image shot by an image pickup apparatus or a cellular phone is transmitted (uploaded) to a server apparatus to be included in a WEB page, for being distributed to other apparatuses. There has been proposed a technique of causing not only the image but also information (GPS information, for example) indicating a shooting location added to the image, and shooting date and time to appear on a WEB page (see e.g. Japanese Patent Laid-Open Publication No. 2005-339214).

However, this raises the problem that when an image shot by a photographer during traveling or the like is distributed in real time, a third party comes to know that the photographer is away from his or her house, based on information indicative of shooting date and time or a shooting location, which is stored in a manner associated with the image.

SUMMARY OF THE INVENTION

The present invention provides an image distribution apparatus and a method of controlling the same, an image transmission apparatus and a method of controlling the same, which are capable of preventing a third party from knowing that a photographer is away from a specific place, based on information indicative of shooting date and time or a shooting location, which is stored in a manner associated with an image shot by the photographer, and storage media storing respective computer-executable programs implementing these methods.

In a first aspect of the present invention, there is provided an image distribution apparatus comprising an image receiving unit configured to receive an image from an image transmission apparatus, the image having location information added thereto which is indicative of a location where the image transmission apparatus existed during shooting processing of the image, a storage unit configured to store the image, a determination unit configured to determine whether or not a location indicated by the location information is within a predetermined area, and a distribution control unit configured to permit distribution of the image via a network if it is determined that the location indicated by the location information is within the predetermined area, and inhibit distribution of the image if it is determined that the location indicated by the location information is not within the predetermined area.

In a second aspect of the present invention, there is provided an image transmission apparatus comprising a storage unit configured to store an image obtained by shooting processing, the image having location information added thereto which is indicative of a location where the image transmission apparatus existed during shooting processing of the image, a determination unit configured to determine whether or not a location indicated by the location information is within a predetermined area, and a transmission control unit configured to cause the image to be transmitted to an image distribution apparatus via a network if it is determined that the location indicated by the location information is within the predetermined area, and cause the image to be prevented from being transmitted to the image distribution apparatus if it is determined that the location indicated by the location information is not within the predetermined area.

In a third aspect of the present invention, there is provide a method of controlling an image distribution apparatus, comprising receiving an image from an image transmission apparatus, the image having location information added thereto which is indicative of a location where the image transmission apparatus existed during shooting processing of the image, storing the image, determining whether or not a location indicated by the location information is within a predetermined area, and permitting distribution of the image via a network if it is determined that the location indicated by the location information is within the predetermined area, and inhibiting distribution of the image if it is determined that the location indicated by the location information is not within the predetermined area.

In a fourth aspect of the present invention, there is provided a method of controlling an image transmission apparatus, comprising storing an image obtained by shooting processing, the image having location information added thereto which is indicative of a location where the image transmission apparatus existed during shooting processing of the image, determining whether or not a location indicated by the location information is within a predetermined area, and causing the image to be transmitted to an image distribution apparatus via a network if it is determined that the location indicated by the location information is within the predetermined area, and causing the image to be prevented from being transmitted to the image distribution apparatus if it is determined that the location indicated by the location information is not within the predetermined area.

In a fifth aspect of the present invention, there is provided a non-transitory computer-readable storage medium storing a computer-executable program for causing a computer to execute a method of controlling an image distribution apparatus, wherein the method comprises receiving an image from an image transmission apparatus, the image having location information added thereto which is indicative of a location where the image transmission apparatus existed during shooting processing of the image, storing the image, determining whether or not a location indicated by the location information is within a predetermined area, and permitting distribution of the image via a network if it is determined that the location indicated by the location information is within the predetermined area, and inhibiting distribution of the image if it is determined that the location indicated by the location information is not within the predetermined area.

In a sixth aspect of the present invention, there is provided a non-transitory computer-readable storage medium storing a computer-executable program for causing a computer to execute a method of controlling an image transmission apparatus, wherein the method comprises storing an image obtained by shooting processing, the image having location information added thereto which is indicative of a location where the image transmission apparatus existed during shooting processing of the image, determining whether or not a location indicated by the location information is within a predetermined area, and causing the image to be transmitted to an image distribution apparatus via a network if it is determined that the location indicated by the location information is within the predetermined area, and causing the image to be prevented from being transmitted to the image distribution apparatus if it is determined that the location indicated by the location information is not within the predetermined area.

According to the present invention, for example, if a photographer shoots an image at a location far away from a specific place, such as a house of the photographer, the image is prevented from being immediately distributed. This makes it possible to prevent a third party from knowing that the photographer is absent from the specific place, based on information indicative of shooting date and time or a shooting location, which is stored in a manner associated with the image shot by the photographer.

The features and advantages of the invention will become more apparent from the following detailed description taken in conjunction with the accompanying drawings.

BRIEF DESCRIPTION OF THE DRAWINGS

FIG. 6 is a diagram showing the configuration of a table used by the blog server for managing articles.

FIG. 14 is a diagram showing the configuration of a table for storing information concerning images received by an on-line album server in an image management system including an image distribution apparatus and an image transmission apparatus according to a third embodiment of the present invention.

DESCRIPTION OF THE EMBODIMENTS

Figure 1:
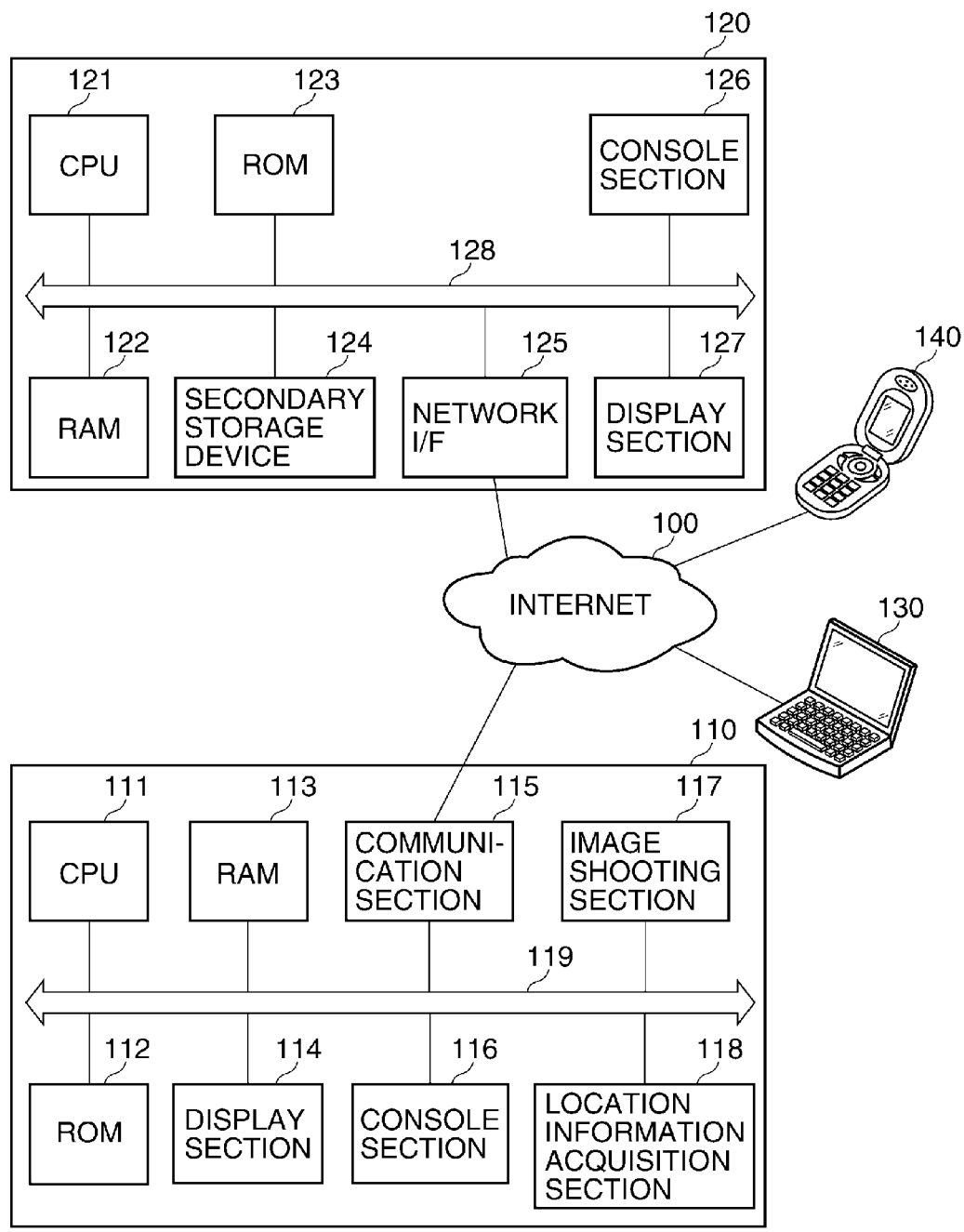
FIG. 1 is a schematic diagram of an image management system including an image distribution apparatus and an image transmission apparatus according to a first embodiment of the present invention.

The present invention will now be described in detail below with reference to the accompanying drawings showing embodiments thereof.

In the first embodiment, an image management system will be described by taking a so-called "blog" as an example. In the present example, it is assumed that a user who creates the blog (hereinafter referred to as the "written article creator") attaches an image shot by a camera-equipped cellular phone, which is an example of an image transmission apparatus, to a text input using the camera-equipped cellular phone, and transmits the text and the image to a blog server, which is an image management system, as an E-mail. Hereinafter, data including a text input by the user using the camera-equipped cellular phone and an image attached to the text is referred to as a "written article". A viewer of the blog (hereinafter referred to as the "written article viewer") is capable of viewing the blog using a personal computer (PC) or a cellular phone. The PC or the cellular phone used by the written article viewer accesses the blog server according to an instruction input by the written article viewer, receives a written article from the blog server, and displays the written article using a web browser or the like.

Although actually, it is possible to carry out operations for creating a written article and sending the same to the blog server not only by a cellular phone but also by a PC, in the first embodiment, a description will be given of a case where a written article is created by a camera-equipped cellular phone. Further, although actually, a written article including only a text without an image and a written article including a plurality of images are sometimes up in a blog, in the first embodiment, it is assumed that a written article transmitted to a blog server denoted by reference numeral 120 in FIG. 1 includes at least one image.

FIG. 1 is a schematic diagram of the image management system including an image distribution apparatus and an image transmission apparatus according to the first embodiment of the present invention. The image management system is constructed by communicably connecting via the Internet 100 a camera-equipped cellular phone 110 used by the written article creator and the blog server 120 for recording, managing and distributing articles. The written article viewer can access the blog server 120 via the Internet 100 by using a PC 130 or a cellular phone 140.

The overall operation control of the camera-equipped cellular phone 110 is carried out by a CPU 111. Programs to be executed by the CPU 111 are stored in a ROM 112. The CPU 111 loads programs read from the ROM 112 in a work area of a RAM 113, and executes the programs, whereby the functions of the camera-equipped cellular phone 110 are realized. In other words, various processes executed by the camera-equipped cellular phone 110 are realized by the CPU 111 which loads programs stored in the ROM 112 in the RAM 113, and executes the same.

The RAM 113 temporarily stores parameters and the like used during execution of the programs, and image data of shot images. A display section 114 displays an operation screen of the camera-equipped cellular phone 110, images being shot, and images having been shot by the camera-equipped cellular phone 110. The display section 114 is an LCD (liquid crystal display), for example. A communication section 115 is wirelessly connected to the Internet via a base station, not shown, for transmitting and receiving information, thereby functioning e.g. as a transmission unit for transmitting images shot by the camera-equipped cellular phone 110 to the blog server 120.

The camera-equipped cellular phone 110 is operated by operating a console section 116 by the written article creator. Specifically, the console section 116 comprises keys (buttons), such as numeric keys, alphabetic keys, and menu keys, and is configured such that predetermined information can be input using each key and a desired operation in a menu displayed on the display section 114 can be selected using an associated key. The console section 116 may comprise e.g. a touch panel including touch keys, which is provided on the display section 114.

An image shooting section 117, which is a module for shooting images, comprises lenses and an image pickup device, none of which are shown. A location information acquisition section 118 receives a signal from a GPS (global positioning system) satellite to acquire the present location of the camera-equipped cellular phone 110 as location information. The respective sections described above exchange information (signals) with each other via a bus 119. Although the camera-equipped cellular phone 110 is provided with a microphone and a speaker for telephone communication, they are omitted from illustration since they are not used in the first embodiment.

The blog server 120 includes a CPU 121, a RAM 122, and a ROM 123. The ROM 123 records a basic control program for the blog server 120. The control program is read into the RAM 122 at the start of the blog server 120, and is executed by the CPU 121. In other words, the CPU 121 of the blog server 120 loads programs stored in the ROM 123 in the RAM 122, and executes the same, whereby various processes executed by the blog server 120 are realized.

A secondary storage device 124 is a mass-storage device, such as a hard disk drive (HDD), and stores a high-level control program (e.g. an OS (operating system)) for the blog server 120, server applications for the blog, various management tools, and so forth. The high-level control program is timely read into the RAM 122, and is executed by the CPU 121. A network interface (I/F) 125, which functions e.g. as a reception unit for receiving images transmitted from the camera-equipped cellular phone 110, provides an interface for connecting the blog server 120 to the Internet.

Although the blog server 120 includes a console section 126 constituted by a keyboard, a mouse, etc., and a display section 127 (e.g. an LCD (liquid crystal display)) for displaying images and a graphical user interface (GUI) screen, the console section 126 and the display section 127 are not substantially used in the first embodiment. The sections described above exchange information (signals) with each other via a bus 128.

The configuration of the PC 130 used by the written article creator (part of the PC 130 used in relation to the present invention) is the same as that of the blog server 120, and hence illustration and description of the PC 130 are omitted. Further, the configuration of the camera-equipped cellular phone 140 used by the written article viewer is the same as that of the camera-equipped cellular phone 110 used by the written article creator, and hence illustration and description of the cellular phone 140 are omitted.

In the first embodiment, the image file of an image as a component of a written article has not only image data itself but also a header for storing metadata concerning the image. The metadata is defined by a standard, such as Exif, and includes shooting date and time, and camera parameters (a focal distance, a zoom ratio, etc.) at the time of shooting. The header also stores information necessary for decoding images. For example, in the case of a JPEG image, a header thereof stores a quantization table, a Huffman table, and so forth.

The Exif is further provided with tags for recording location information acquired from the GPS by the location information acquisition section 118, as metadata. In the camera-equipped cellular phone 110, the location information acquisition section 118 acquires location information on the camera-equipped cellular phone 110 when shooting of an image is performed. The CPU 111 of the camera-equipped cellular phone 110 functions as a location information-adding unit, whereby the location information acquired by the location information acquisition section 118 is added as metadata to the image shot when the location information has been acquired.

It is also possible to add location information other than the location information by the GPS (hereinafter referred to as the "location information other than GPS information") to an image. Examples of the location information other than GPS information include information for identifying a base station to which the camera-equipped cellular phone 110 has been connected during shooting of the image, and location information on a network, such as a wireless LAN, or a PC to which the camera-equipped cellular phone 110 is connected. Further, a place name or an address input by the user can also be used as the location information other than GPS information.

Further, the Exif is provided with a tag called a "maker note", which can be freely used by a camera maker (manufacturer of the camera-equipped cellular phone 110). The tag makes it possible to record the location information other than GPS information in the maker note. Further, in the present embodiment, a metadata system other than the Exif may be employed.

When a written article is to be created and transmitted to the blog server 120 using an E-mail prepared by the written article creator, a screen for inputting a mail address, a subject, an attached file, the main body of the written article and so forth is displayed as an operation screen on the display section 114 of the camera-equipped cellular phone 110. When transmitting the written article, the written article creator is required to input the address of the blog server 120, the title of the E-mail, the file pass of an image file of an image as a component of the written article, and the main body of the blog. After completion of the input of the above information, when a transmission process is executed by operation of the console section 116, the input information is transmitted from the communication section 115 to the blog server 120 as the written article in the form of an E-mail.

Here, it is assumed that the written article creator shoots an image at a certain location, creates a written article at the shooting location or in the vicinity thereof, and transmits the created article from the camera-equipped cellular phone 110 to the blog server 120. In this case, conventionally, a written article viewer uses the PC 130 or the cellular phone 140 to access the blog server 120 to receive the written article, thereby causing the same to be displayed. This makes it possible for the written article viewer to acquire location information and shooting time included in the image of the written article. When the shooting location thus acquired is away from the address of the house of the written article creator, it is easily inferred from the shooting time and the present time that the written article creator is not in his or her house.

Figure 2:
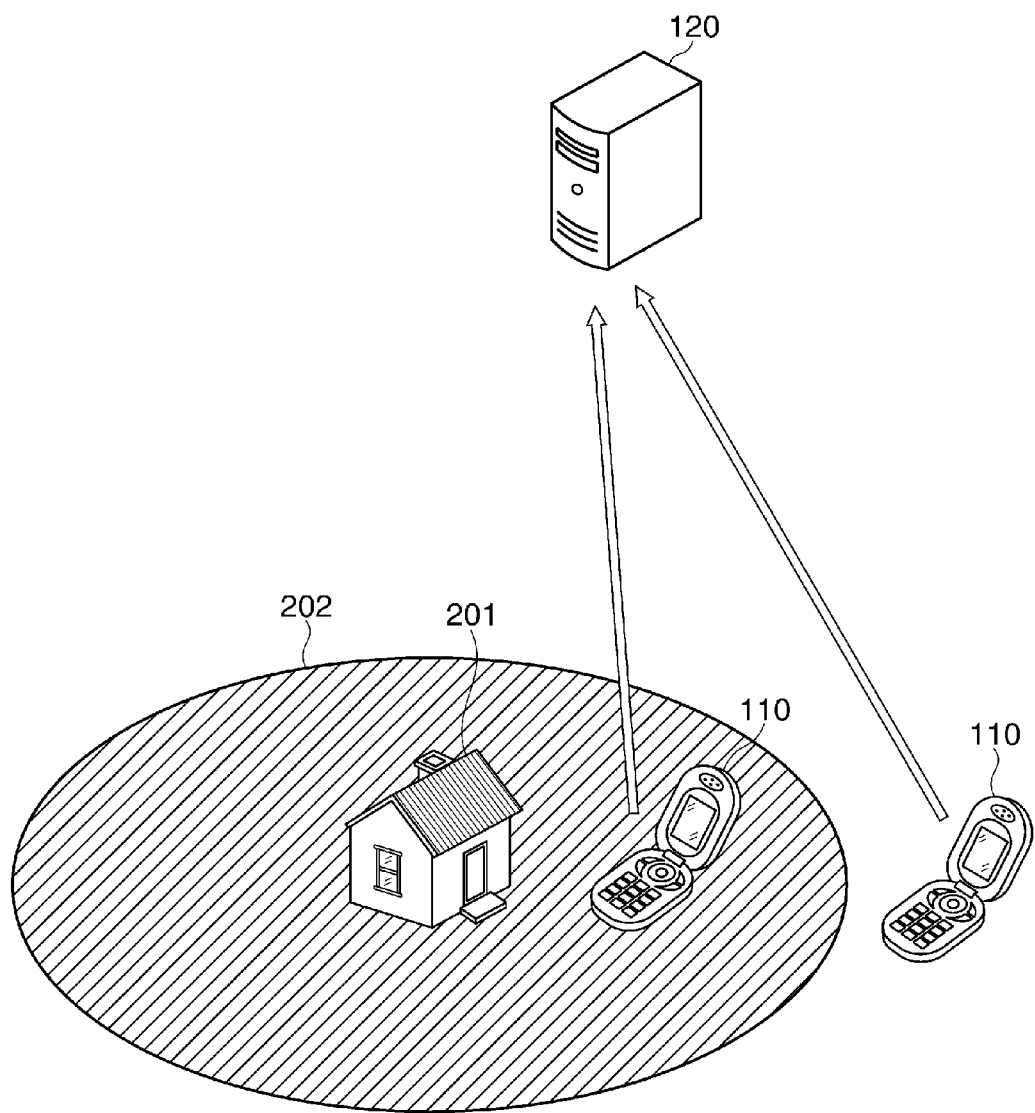
FIG. 2 is a schematic diagram of a geographical location relationship between component elements of the image management system shown in FIG. 1.

To solve this problem, the first embodiment is configured as described hereinafter. FIG. 2 is a schematic diagram of the geographical location relationship between component elements of the image management system according to the first embodiment.

The blog server 120 has a distribution permitting area 202 set as geographical information which serves as criteria for deciding whether to permit or postpone the distribution of the written article which is transmitted to the blog server 120. In the first embodiment, it is assumed that a house 201 of the written article creator is within the distribution permitting area 202.

Figure 3:
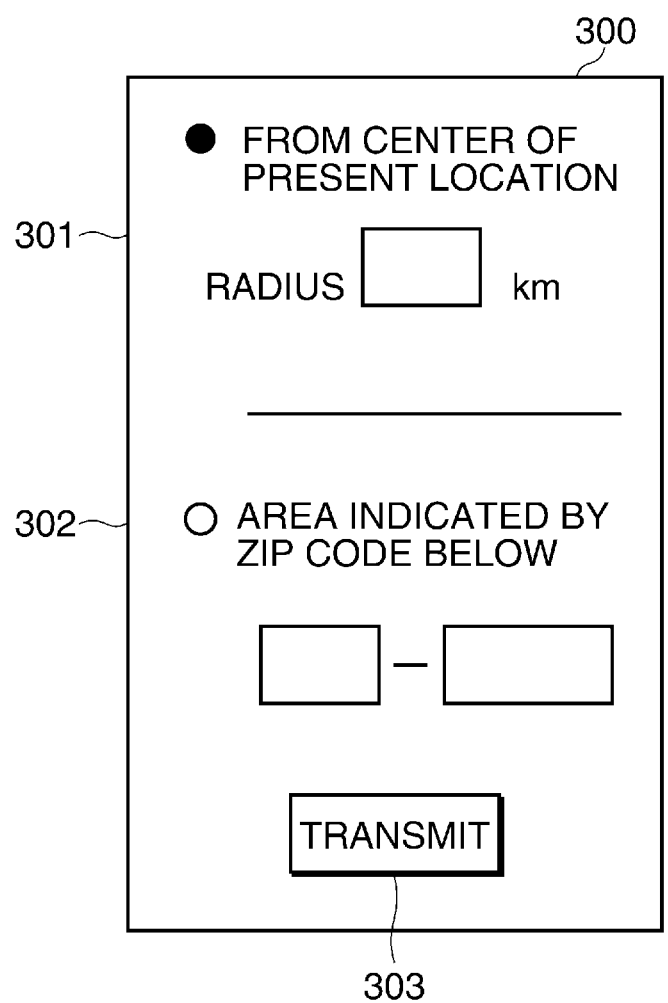
FIG. 3 is a diagram of an example of a menu screen for setting a distribution permitting area in the first embodiment.

Next, a method of designating the distribution permitting area 202 will be described in detail with reference to FIG. 3. FIG. 3 shows an example of a menu screen 300 for setting the distribution permitting area. When the camera-equipped cellular phone 110 of the written article creator accesses a specific address of the blog server 120, the menu screen 300 is transmitted from the blog server 120 to the camera-equipped cellular phone 110, and is displayed on the display section 114 of the camera-equipped cellular phone 110.

On the FIG. 3 menu screen 300, the user can select one of two methods for designating the distribution permitting area. As shown by an upper row 301 of the menu screen 300, a first one of the methods is for acquiring the present location of the camera-equipped cellular phone 110 by the GPS and designating the inside of a circle having a designated radius about the acquired present location as the distribution permitting area 202.

In the case of using the first method in the first embodiment, it is assumed that the written article creator operates the camera-equipped cellular phone 110 at a location where the house of the written article creator is within the distribution permitting area 202. In a typical example, the written article creator operates the camera-equipped cellular phone 110 in his or her house, whereby the inside of the circle having the designated radius about the house of the written article creator is set as the distribution permitting area 202.

As shown by a lower row 302 of the menu screen 300, a second one of the methods is for the user to input a zip code to thereby designate an area associated with the input zip code as the distribution permitting area 202. In the case of using the second method in the first embodiment, although a location for operating the camera-equipped cellular phone 110 is not limited, it is assumed that the written article creator designates the zip code such that the house thereof is within the distribution permitting area 202.

The methods for designating the distribution permitting area 202 are not limited to the above, but the distribution permitting area 202 may be set to a rectangular area around the house of the written article creator which formed by desired distances in the east-west direction and the south-north direction or to a municipality or the like including the house of the written article creator.

When the written article creator designates the distribution permitting area 202 as described above, and presses a transmission button 303, the configured information is transmitted to the blog server 120, and the blog server 120 stores the information in the secondary storage device 124 in a manner associated with the written article creator. Upon receipt of the written article from the camera-equipped cellular phone 110, the CPU 121 of the blog server 120 acquires location information from an image included in the written article. Then, the CPU 121 determines whether or not a location indicated by the acquired location information is within the distribution permitting area 202.

If the CPU 121 obtains a result of the determination that the location indicated by the location information is within the distribution permitting area 202, the CPU 121 determines that the written article is distributable, and immediately after receipt of a request for distribution of the written article from the PC 130 or the cellular phone 140 of the written article viewer, the CPU 121 distributes the written article to the PC 130 or the cellular phone 140. On the other hand, if the CPU 121 obtains a result of the determination that the location indicated by the location information is outside the distribution permitting area 202, the CPU 121 determines that the distribution of the written article is to be postponed, and even when the CPU 121 receives a request for distribution of the written article from the PC 130 or the cellular phone 140 of the written article viewer, the CPU 121 does not distribute the written article to the PC 130 or the cellular phone 140 until predetermined conditions are satisfied. Examples of the predetermined conditions include one that the camera-equipped cellular phone 110 of the written article creator has entered the distribution permitting area 202 and one that a predetermined time period has elapsed after shooting date and time information on which is attached to the image. The above-described processing will be described hereinafter with reference to flowcharts.

Figure 4:
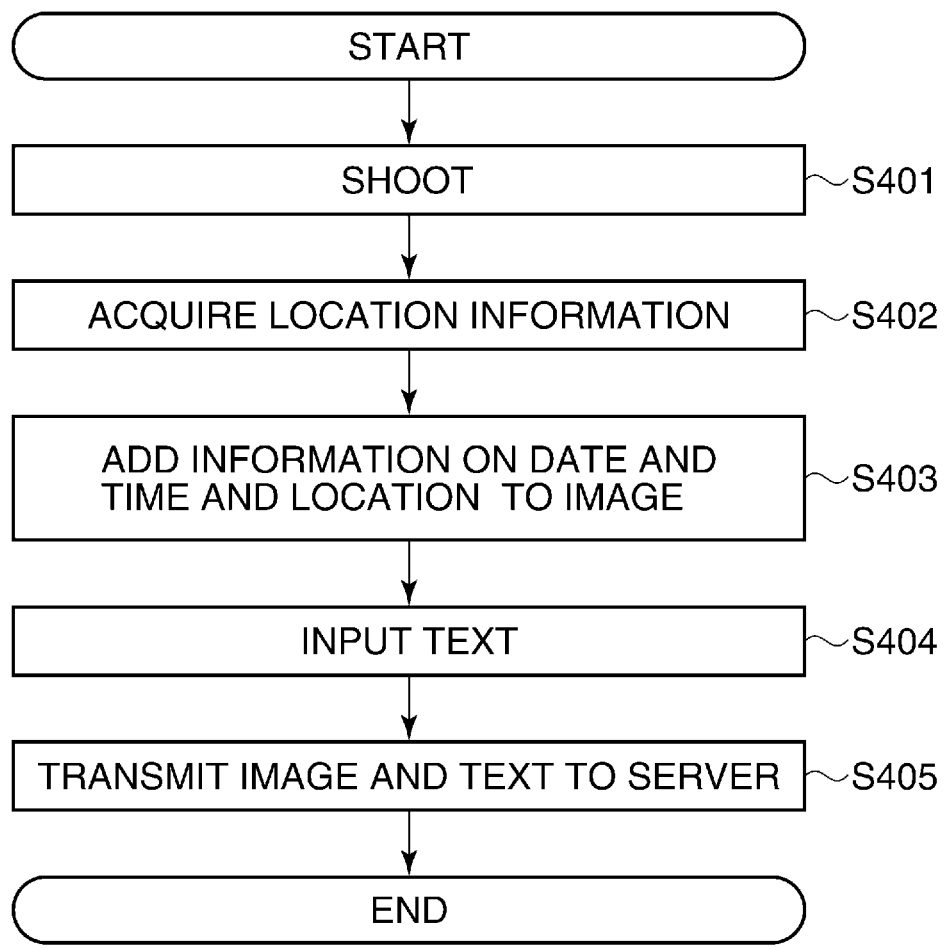
FIG. 4 is a flowchart of a written article transmission process in the first embodiment, in which a written article creator creates a written article using a cellular phone with a camera and transmits the written article to a blog server.

FIG. 4 is a flowchart of a written article transmission process in which the written article creator creates a written article using the camera-equipped cellular phone 110 and transmits the written article to the blog server 120. First, the image shooting section 117 of the camera-equipped cellular phone 110 performs shooting in response to an operation by the written article creator (step S401). The CPU 111 of the camera-equipped cellular phone 110 stores a shot image as an image file in the RAM 113, and at the same time adds information on shooting date and time to the image file.

Then, location information indicative of a location where the camera-equipped cellular phone 110 exists is acquired by the location information acquisition section 118 (step S402). Here, it is assumed that the latitude and longitude of the location are acquired as the location information by using the GPS. Next, the CPU 111 adds the location information acquired in the step S402 to the image file stored in the step S401, and stores the resulting image file (step S403). The CPU 111 inputs a text forming a written article in response to an operation made by the written article creator on the console section 116 (step S404). Then, the CPU 111 transmits the article formed by the image file including the shooting date and time information and the location information and the input text to the blog server 120 via the communication section 115 (step S405).

Figure 5:
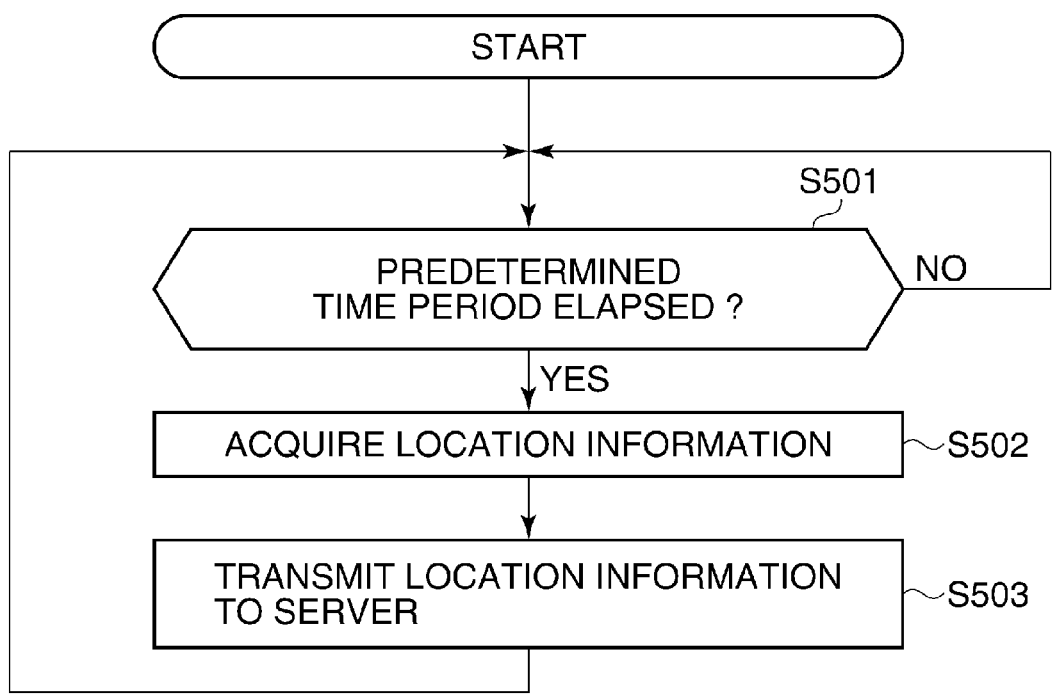
FIG. 5 is a flowchart of a location information transmission process in the first embodiment, in which the camera-equipped cellular phone periodically transmits location information on the camera-equipped cellular phone to the blog server.

FIG. 5 is a flowchart of a location information transmission process in which the camera-equipped cellular phone 110 periodically transmits location information on the camera-equipped cellular phone 110 to the blog server 120. The CPU 111 of the camera-equipped cellular phone 110 determines whether or not a predetermined time period (e.g. five minutes) has elapsed (step S501). The predetermined time period can be set as desired by the written article creator operating the camera-equipped cellular phone 110.

The CPU 111 is kept on standby until the predetermined time period elapses ("NO" to the step S501). When the predetermined time period has elapsed ("YES" to the step S501), the location information on the camera-equipped cellular phone 110 is reacquired by the location information acquisition section 118 (step S502), and the reacquired location information is transmitted to the blog server 120 by the communication section 115 (step S503). After that, the process returns to the step S501.

Next, a description will be given of a sequence of operations in the image management system. FIG. 6 is a diagram showing the configuration of a table used by the blog server 120 for managing articles. In the first embodiment, it is assumed that the blog server 120 has a table 600 on an written article creator-by-written article creator basis. One line of the table 600 is associated with one article.

Upon receipt of a written article from the camera-equipped cellular phone 110, the CPU 121 of the blog server 120 divides the written article into a text file and an image file, and stores the text file and the image file in the secondary storage device 124. Then, the CPU 121 stores the address of the text file and the address of the image file in respective paths 601 and 602. Further, the CPU 121 acquires location information added to the image file from the image file, and stores the location information in image location information (latitude and longitude) 603. The table 600 is provided with flags 604 indicative of whether articles associated therewith distributable or distributions thereof are to be postponed on a written article-by-article basis.

The blog server 120 stores and manages distribution permitting areas 202 on a written article creator-by-written article creator basis. The CPU 121 determines based on information of the distribution permitting areas 202 whether or not the information indicated by the image location information 603 is within the distribution permitting area 202. If the location indicated by the image location information 603 is within the distribution permitting area 202, an associated flag 604 is set to "Yes" indicating that an associated article is distributable. However, if the location indicated by the image location information 603 is outside the distribution permitting area 202, an associated flag 604 is set to "No" indicating that distribution of an associated article is to be postponed. When the flag 604 indicates that an associated article is distributable, distribution of the associated article is permitted at the time point, whereas when the flag 604 indicates that distribution of an associated article is to be postponed, distribution of the associated article is inhibited at the time point.

Whether or not the location indicated by the image location information 603 is within the distribution permitting area 202 is determined e.g. in the following manner: When the inside of the circle having the designated radius about the house of the written article creator, for example, is designated as the distribution permitting area 202 by the first method described with reference to FIG. 3, the distance between the house of the written article creator and the camera-equipped cellular phone 110 is determined from the latitude and longitude of the center of the distribution permitting area 202 and the latitude and longitude of the location indicated by the image location information 603. If the distance thus determined is not larger than the designated radius, it is determined that the location indicated by the image location information 603 is within the distribution permitting area 202, whereas if the determined distance is larger than the designated radius, it is determined that the location indicated by the image location information 603 is outside the distribution permitting area 202.

Further, when the distribution permitting area 202 is designated by the zip code by the second method described with reference to FIG. 3, it is only required to provide the blog server 120 e.g. with information in which the zip code and an actual shape of a map are associated with each other. Alternatively, the blog server 120 may be provided with a function for causing the blog server 120 to access another device which includes the information in which the zip code and the actual shape of the map are associated with each other (map information management device).

The blog server 120 and the map information management device approximately represent a shape of a map using a plurality of triangles and rectangles having various sizes, and it is sequentially determined whether or not any of the triangles and the rectangles contains a location indicated by the latitude and longitude of the image location information 603. As a consequence, if the location indicted by the image location information 603 is contained any of the triangles and the rectangles, it is determined that the location indicated by the image location information 603 is within the distribution permitting area 202. On the other hand, if the location indicated by the image location information 603 is not contained in any of the triangles and the rectangles, it is determined that the location indicated by the image location information 603 is outside the distribution permitting area 202.

Figure 7:
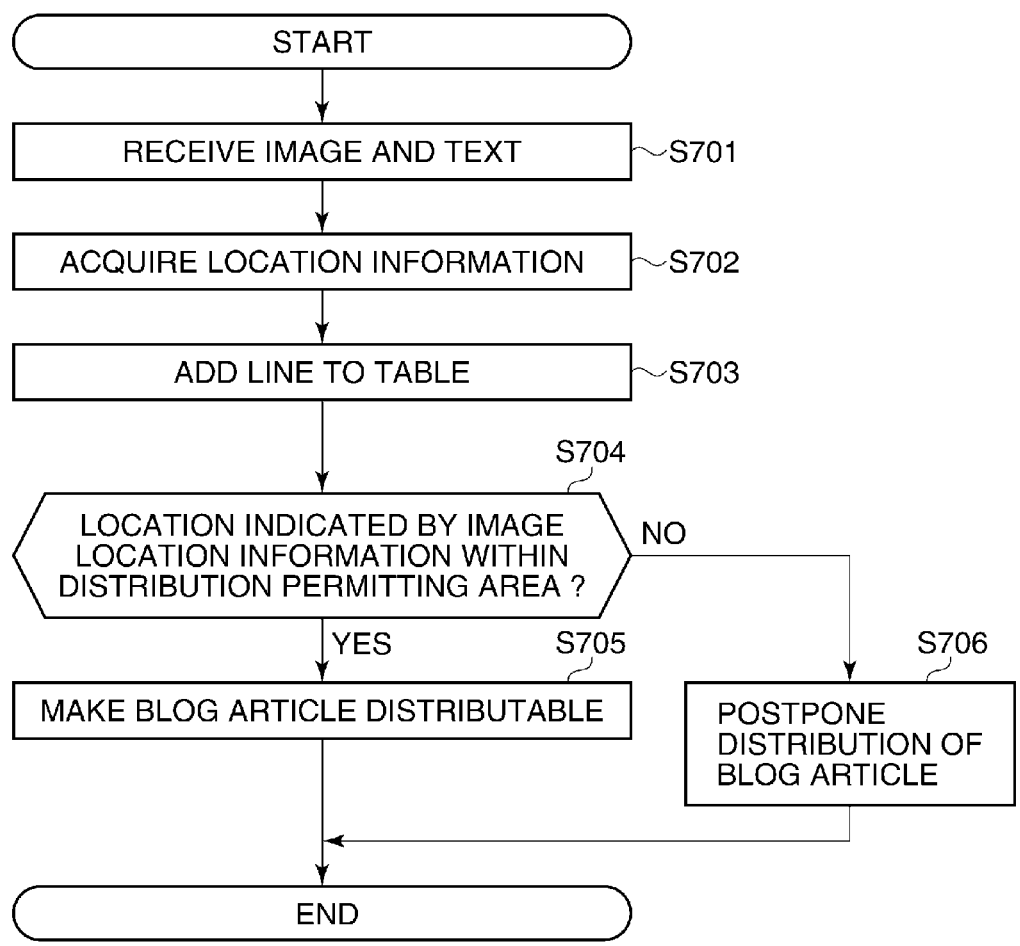
FIG. 7 is a flowchart of a written article reception process executed in the first embodiment by the blog server when receiving a written article.

FIG. 7 is a flowchart of a written article reception process executed by the blog server 120 when receiving a written article. Upon receipt of a written article formed by a text and an image via the network interface 125, the blog server 120 stores the written article (step S701). The CPU 121 of the blog server 120 acquires location information of the image included in the received written article (step S702), and adds a line associated with the received written article to the table 600 (step S703). Then, the CPU 121 determines whether or not the location indicated by the location information acquired in the step S702 is within the set distribution permitting area 202 (step S704). If the location indicated by the location information acquired in the step S702 is within the distribution permitting area 202 ("YES" to the step S704), the CPU 121 determines that the written article is distributable (step S705). Specifically, in the step S705, a flag 604 in the table 600, associated with the written article, is set to "Yes". Then, upon receipt of a request for distribution of the written article from the PC 130 or the cellular phone 140 of the written article viewer, the CPU 121 distributes the written article to the PC 130 or the cellular phone 140. On the other hand, if the location information acquired in the step S702 indicates that the camera-equipped cellular phone 110 is outside the distribution permitting area 202 ("NO" to the step S704), the CPU 121 determines that distribution of the written article is to be postponed (step S706). Specifically, the CPU 121 sets the flag 604 in the table 600, associated with the written article, to "No", and even when receiving a request for distribution of the written article from the PC 130 or the cellular phone 140 of the written article viewer, the CPU 121 does not distribute the written article to the PC 130 or the cellular phone 140.

Figure 8:
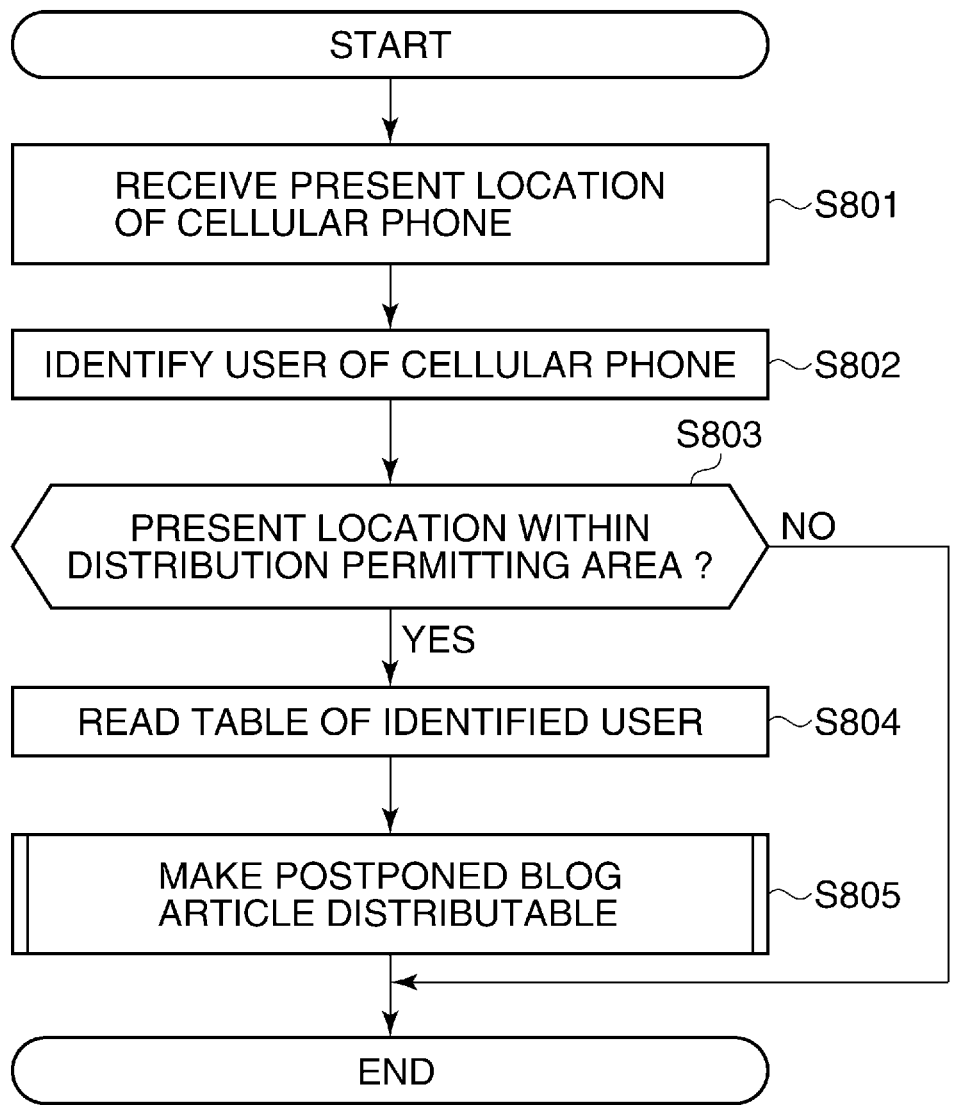
FIG. 8 is a flowchart of a location information reception process executed in the first embodiment by the blog server when receiving location information transmitted from the camera-equipped cellular phone of the written article creator.

FIG. 8 is a flowchart of a location information reception process executed by the blog server 120 when receiving location information transmitted from the camera-equipped cellular phone 110 of the written article creator. When the blog server 120 receives location information on the camera-equipped cellular phone 110 (step S801), the user of the camera-equipped cellular phone 110 is identified e.g. from a serial number of a UIM (user identity module) of the camera-equipped cellular phone 110 (step S802). To perform the processing in the step S802, the blog server 120 stores respective serial numbers of UIMs of camera-equipped cellular phones 110 used by respective written article creators, in advance.

Then, it is determined whether or not the location information received in the step S801 indicates that the camera-equipped cellular phone 110 is within a distribution permitting area 202 designated by the user (i.e. written article creator) identified in the step S802 (step S803). If the location information indicates that the camera-equipped cellular phone 110 is outside the distribution permitting area 202, ("NO" to the step S803), the present process is immediately terminated.

If the location information indicates that the camera-equipped cellular phone 110 is within the distribution permitting area 202, ("YES" to the step S803), the table 600 associated with the user (written article creator) is loaded in the RAM 122 (step S804). Then, the CPU 121 of the blog server 120 refers to the table 600, and changes a flag 604, which is associated with a written article whose distribution has been postponed with the associated flag 604 set to "No", to "Yes" to thereby make the written article distributable (step S805). After that, upon receipt of a request for distribution of the written article from the PC 130 or the cellular phone 140 of the written article viewer, the CPU 121 distributes the written article to the PC 130 or the cellular phone 140.

In a case where a condition required for a written article in a distribution postponed state to satisfy when making the same distributable is the lapse of a predetermined time period, that is, whether the predetermined time period has elapsed from shooting time, the CPU 121 of the blog server 120 acquires an image file path 602 on a line on which the associated flag 604 is "No", from the table 600 at predetermined time intervals, and reads out an associated image file. Then, the CPU 121 determines whether or not the predetermined time period has elapsed from a time point indicated by shooting date and time information added to the read image file. If the predetermined time period has elapsed from the time point indicated by the shooting date and time information, the CPU 121 changes the flag 604 to "Yes" so as to indicate that the written article is distributable. Note that the flag 604 may be changed to "Yes" when a predetermined time period has elapsed not from the shooting date and time but from a date when the written article has received in the step S701.

Figure 9:
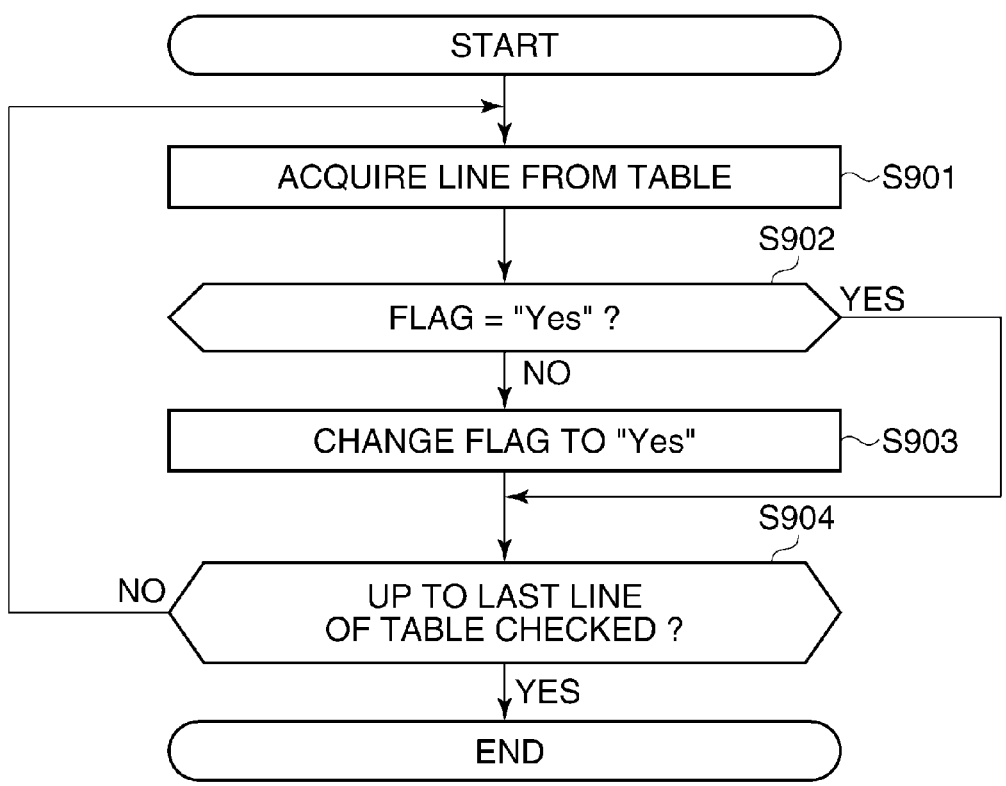
FIG. 9 is a flowchart of a blog publication process executed in a step of the FIG. 8 location information reception process.

Next, a detailed description will be given of the processing in the step S805. FIG. 9 is a flowchart of a blog publication process executed in the step S805 of the FIG. 8 location information reception process. First, a line (first line when this step is first executed) is obtained from the table 600 provided in the step S804 (step S901), and it is determined whether or not a flag 604 on the line is "Yes" (step S902). If the flag 604 on the line is "Yes" ("YES" to the step S902), the process proceeds to a step S904.

If the flag 604 on the line is "No" ("NO" to the step S902), the flag 604 is changed from "No" to "Yes", whereby distribution of a written article associated with the line is permitted (step S903), and then the process proceeds to the step S904. In the step S904, it is determined whether or not the checking of the table 600 as to the flag 64 from the first line to the last line is completed. If all the lines of the table 600 have been checked ("YES" to the step S904), the present process is terminated, whereas if not ("NO" to the step S904), the process is returned to the step S901.

Figure 10:
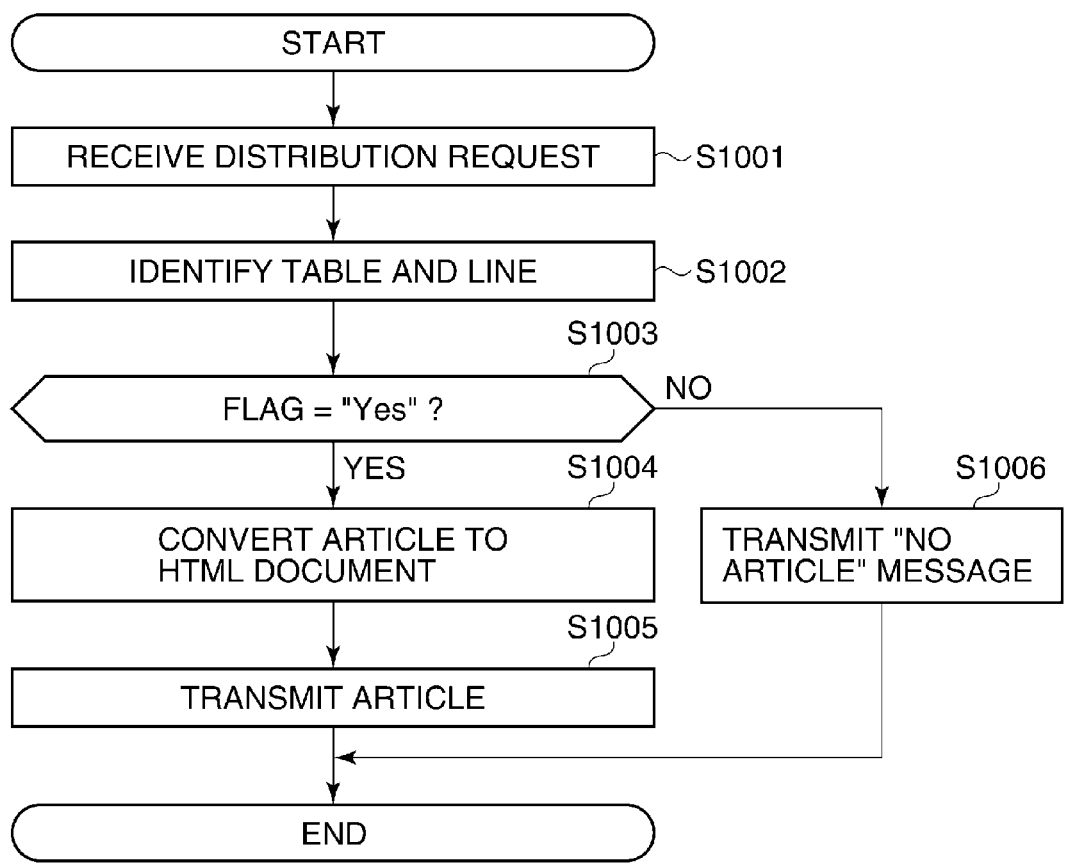
FIG. 10 is a flowchart of a written article transmission process executed in the image management system shown in FIG. 1 by the blog server when a written article viewer is about to view a blog.

FIG. 10 is a flowchart of a written article transmission process executed by the blog server 120 when a written article viewer who is about to view a blog accesses the blog server 120 using the PC 130 or the cellular phone 140. Upon receipt of a distribution request having the address of a written article designated therein from the PC 130 or the cellular phone 140 of the written article viewer (step S1001), the CPU 121 of the blog server 120 identifies a table 600 and a line thereof associated with the written article from the address (step S1002). Then, the CPU 121 determines whether or not a flag 604 on the line identified in the step S1002 is "Yes" (step S1003).

If the flag 604 is "Yes" ("YES" to the step S1003), which means that the distribution of the written article is permitted, the CPU 121 converts the written article to a format (e.g. HTML document) in which the written article can be displayed using the PC 130 or the cellular phone 140 of the written article viewer (step S1004). Then, the CPU 121 transmits the written article the format of which has been converted to the PC 130 or the cellular phone 140 of the written article viewer via the network interface 125 (step S1005), followed by terminating the present process. On the other hand, if the flag 604 is "No" ("NO" to the step S1003), the CPU 121 transmits an error message or a HTML document indicating that the written article does not exist to the PC 130 or the cellular phone 140 of the written article viewer (step S1006), followed by terminating the present process.

In the first embodiment, after the camera-equipped cellular phone 110 of the written article creator has moved into the distribution permitting area 202, when the blog server 120 receives the location information on the camera-equipped cellular phone 110, the written article is changed from the distribution postponed state to the distributable state (see FIG. 8). As a variation, the written article distribution of which has been postponed may be made distributable in the following manner.

For example, the image management system may be configured such that when the camera-equipped cellular phone 110 of the written article creator has moved into the distribution permitting area 202, the camera-equipped cellular phone 110 can access a specific address of the blog server 120 to instruct the blog server 120 to make distributable a written article distribution of which has been postponed. Further, the image management system may be configured such that the camera-equipped cellular phone 110 itself detects that the camera-equipped cellular phone 110 has entered the distribution permitting area 202, transmits location information or a specific signal to the blog server 120, and instructs the blog server 120 to make distributable a written article distribution of which has been postponed.

Further, although in the first embodiment, no article viewer can view a written article distribution of which has been postponed, the image management system may be configured such that only specific article viewers, such as a family member or a friend of a written article viewer, can view a written article distribution of which has been postponed. To this end, the image management system may be configured such that first, a password for viewing a written article, provided by a written article creator, is notified to the specific article viewers in advance; the password can be registered in the blog server 120; the blog server 120 requests a written article viewer who desires to view the written article distribution of which has been postponed to input the password; and the written article distribution of which has been postponed is distributed to a written article viewer who has input a correct password.

Further, although in the first embodiment, distribution of a written article including an image shot outside the distribution permitting area 202 is postponed by the blog server 120, only a text included in the written article may be distributed while postponing only distribution of the image. Further, only distribution of a date may be postponed.

Further, in the first embodiment, it is determined whether distribution of a written article is permitted or postponed, using location information added to an image file when an image is shot. However, it is possible to imagine a case where no location information can be imparted to an image file, such as a case where the GPS function is not provided in the camera-equipped cellular phone 110 of the written article creator or a case where the camera-equipped cellular phone 110 cannot receive electric waves from the GPS satellite. In such a case, when a written article is to be transmitted to the blog server 120, the location of a base station closest to the present location of the camera-equipped cellular phone 110 may be added to an image file such that the location of the closest base station is used to determine whether distribution of the written article is permitted or postponed.

Further, although in the first embodiment, an image is shot and a text is input by the camera-equipped cellular phone 110, and a written article formed by the image and the text is created for transmission to the blog server 120, it is possible to employ a method other than the above. For example, the written article creator may shoot an image using a digital camera having the GPS function, copy the shot image on a PC (mobile PC), input a text by the PC, and transmit a written article created as above from the PC to the blog server 120. Although in the first embodiment, the description has been given of the case where distribution of a written article is permitted or postponed by taking the blog as an example, this is not limitative, but the present embodiment can be applied to image distribution by systems, such as an on-line album, a mailing list, and a SNS (social networking service).

According to the first embodiment, in a case where the written article creator shoots an image during traveling at a location away from a specific place, such as his or her house, and transmits a written article comprising the image to the blog server 120, distribution of the written article is postponed. This makes it impossible for a written article viewer to estimate that the written article creator is away from his or her house.

Next, a second embodiment of the present invention will be described. In the second embodiment, a description is given of a so-called "on-line album", by way of example. When a user of the on-line album (hereinafter referred to as the "album user") shoots images using a digital camera, the digital camera automatically transmits the shot images to an on-line album server. The on-line album server records and manages the received images, and when a viewing request for an image is received from a PC or a cellular phone of another user of the on-line album (hereinafter referred to as the "album viewer"), the requested image is distributed.

In the second embodiment, the hardware configuration of the digital camera used by the album user is the same as that of the camera-equipped cellular phone 110 shown in FIG. 1. Further, the hardware configuration of the on-line album server is the same as that of the blog server 120 shown in FIG. 1. The configuration of the PC or the cellular phone of the album viewer is the same as that of the PC 130 or cellular phone 140, shown in FIG. 1, of the written article viewer. Therefore, corresponding components of the digital camera used by the album user (corresponding to the camera-equipped cellular phone 110), the on-line album server (corresponding to the blog server 120), and the PC (corresponding to the PC 130) or the cellular phone (corresponding to the cellular phone 140) of the album viewer are denoted by the same reference numerals, and description thereof is omitted.

In the second embodiment, upon shooting an image, the digital camera 110 of the album user receives electric waves from the GPS satellite to thereby acquire location information. If the location of the digital camera 110 during shooting is within a predetermined transmission permitting area (corresponding to the distribution permitting area 202 described in the first embodiment), the digital camera 110 transmits the shot image to the on-line album server via wireless communication. A method of configuring the transmission permitting area and a method of determining whether or not the location of the digital camera 110 is within the transmission permitting area are substantially the same as described as to the first embodiment, and hence description thereof is omitted.

If the location of the digital camera 110 during shooting is outside the transmission permitting area (i.e. is not within the transmission permitting area), the digital camera 110 does not transmit the shot image to the on-line album server but stores the image file of the image and a path for the image file (image file path) in a memory of the digital camera 110. After that, when the digital camera 110 has moved into the transmission permitting area, the digital camera 110 reads out the image according to the stored image file path, and transmits the image to the on-line album server.

Figure 11:
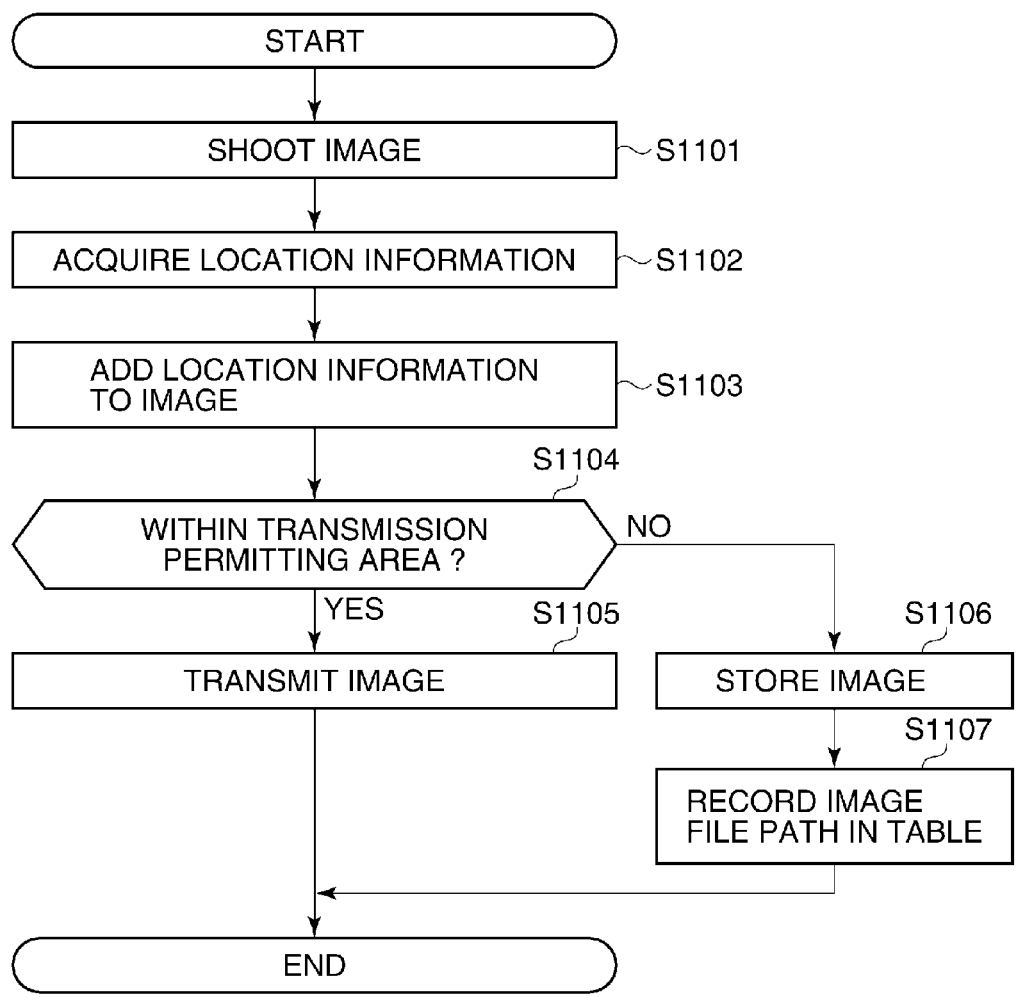
FIG. 11 is a flowchart of an image shooting & transmitting/recording process executed in an image management system including an image distribution apparatus and an image transmission apparatus according to a second embodiment of the present invention, when the digital camera has shot an image.

FIG. 11 is a flowchart of an image shooting & transmitting/recording process executed when the digital camera has shot an image. When the album user presses a shutter button, not shown, of the digital camera 110, the image shooting section 117 of the digital camera 110 shoots an object, and generates an image for storage in a storage medium (step S1101). Further, the CPU 111 of the digital camera 110 receives electric waves from the GPS satellite during shooting to thereby acquire location information (latitude and longitude) indicative of a location where the digital camera 110 exists (step S1102), and adds the acquired location information to the image shot in the step S1101 (step S1103).

Next, the CPU 111 of the digital camera 110 determines whether or not the location indicated by the location information (latitude and longitude) of the digital camera 110, acquired in the step S1102, is within the transmission permitting area (step S1104). As described hereinabove, the transmission permitting area is set by the album user in advance. If it is determined that the location indicated by the location information is within the transmission permitting area ("YES" to the step S1104), the CPU 111 of the digital camera 110 transmits the image having the location information added thereto in the step S1103 to the on-line album server via the communication section 115 (step S1105), whereafter the present process is terminated. On the other hand, If it is determined that the location indicated by the location information is outside the transmission permitting area ("NO" to the step S1104), the CPU 111 of the digital camera 110 does not transmit the image to the on-line album server but stores the image as an image file in the memory (step S1106). Further, the CPU 111 stores a path for the image file in the memory (step S1107), followed by terminating the present process.

Similarly to the blog server 120 described in the first embodiment, the digital camera is provided with a table for storing the image file path (see FIG. 6), and in the step S1107, the name of the image file (image file name) and the image file path are stored in this table.

Figure 12:
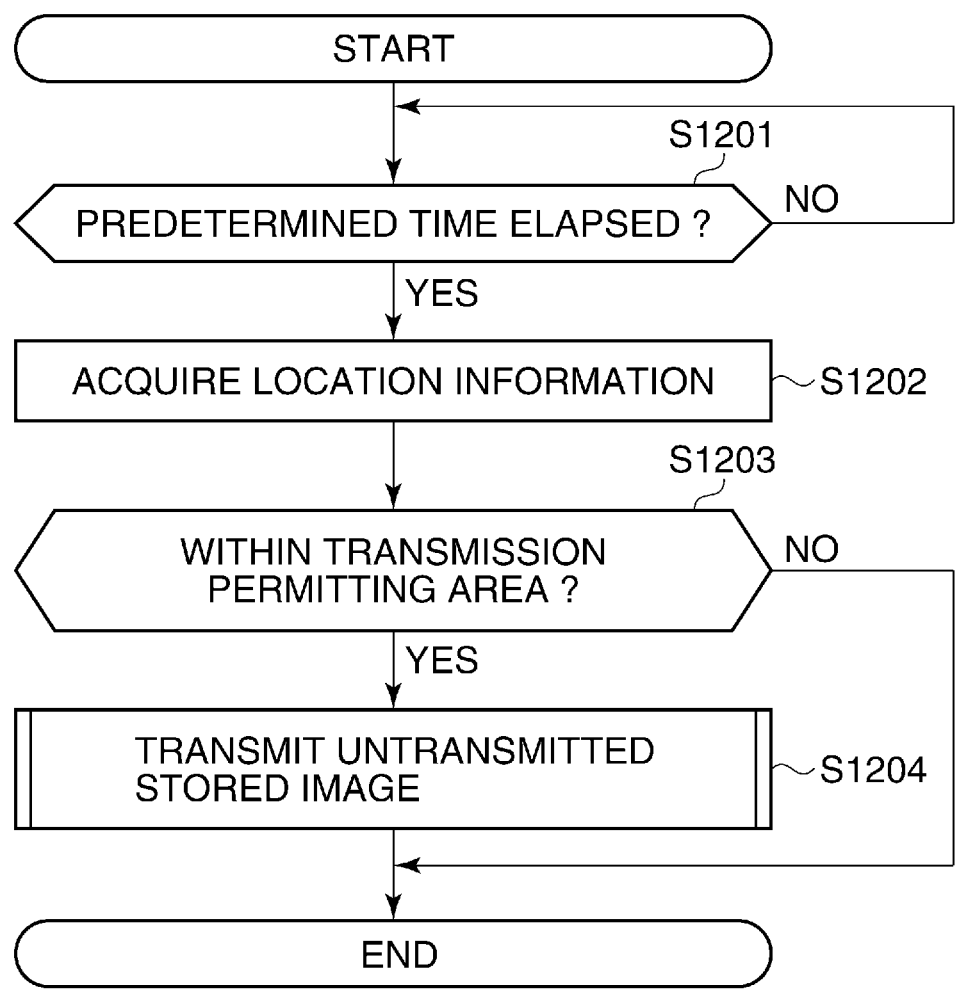
FIG. 12 is a flowchart of a location information & image transmission process executed in the image management system shown in FIG. 11 by the digital camera for periodically transmitting location information on the digital camera to an on-line album server.

FIG. 12 is a flowchart of a location information & image transmission process executed by the digital camera 110 for periodically detecting location information thereof, and transmitting an untransmitted image to the on-line album server when the digital camera 110 has moved into the transmission permitting area. In the digital camera 110, it is determined whether or not a predetermined time period (e.g. five minutes) has elapsed (step S1201). The album user can set the predetermined time period as desired by operating the digital camera 110.

The CPU 111 of the digital camera 110 is kept on standby until the predetermined time period has elapsed ("NO" to the step S1101). When the predetermined time period has elapsed ("YES" to the step S1101), the digital camera 110 receives electric waves from the GPS satellite to thereby acquire location information again (step S1202), and determines whether or not a location indicated by the reacquired location information is within the transmission permitting area (step S1203).

If the location indicated by the reacquired location information is within the transmission permitting area ("YES" to the step S1203), the CPU 111 of the digital camera 110 transmits the untransmitted image stored in the memory of the digital camera 110 to the on-line album server (step S1204), followed by terminating the present process. If the location indicated by the reacquired location information is outside the transmission permitting area ("NO" to the step S1203), the present process is immediately terminated.

Figure 13:
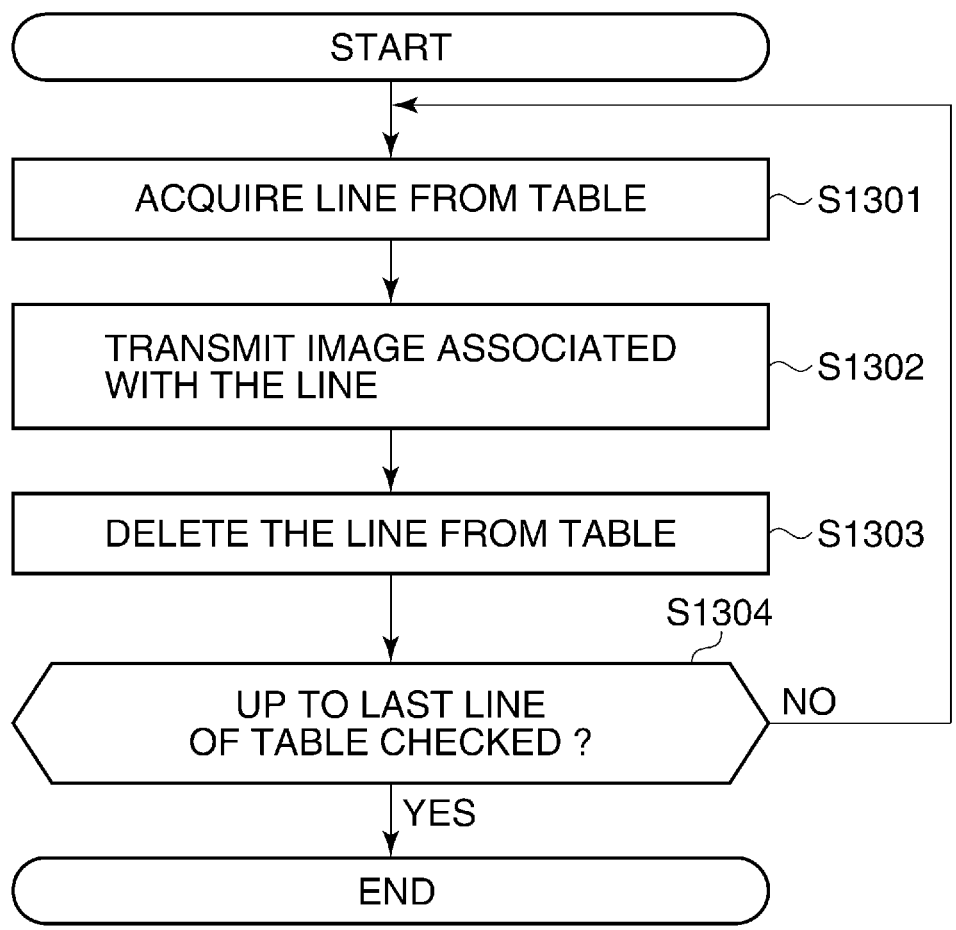
FIG. 13 is a flowchart of an image transmission process executed in a step of the FIG. 12 location information & image transmission process.

FIG. 13 is a flowchart of an image transmission process executed in the step S1204 of the FIG. 12 location information & image transmission process. First, the table storing the image file name and the image file path is read from the memory, and a first line (when this step is first executed, a first image file name and an image file path therefore in the table) is acquired from the table (step S1301). Then, the image file associated with the acquired image file path is read out and transmitted to the on-line album server (step S1302).

The line storing the name of the transmitted image file and the image file path is deleted from the table (step S1303), and then it is determined whether or not checking of the table from the first line to the last line is completed (step S1304). If the checking of the table from the first line to the last line is not completed ("NO" to the step S1304), the process is returned to the step S1301, whereas if the checking of the table from the first line to the last line is completed ("YES" to the step S1304), the process is terminated.

The operation of the on-line album server in the second embodiment is the same as that of a normal on-line server, and the description has already been given above about the blog server.

Although in the second embodiment, when the digital camera of the album user has entered the transmission permitting area, an image shot outside the transmission permitting area is transmitted from the digital camera to the on-line album server, thereby enabling the album viewer to view the image, this is not limitative, but the image management system according to the second embodiment can be configured as below.

For example, the image management system can be configured such that when the album user presses a predetermined button, such as a "return home button", provided in the digital camera, when he or she is within the transmission permitting area, the digital camera transmits the image file of an image shot outside the transmission permitting area to the on-line album server. This enables the album viewer to view the image when the image is uploaded to the on-line album server.

According to the second embodiment, when the album user shoots an image at a location away from a specific place, such as his or her house, during traveling, transmission of the image to the on-line album server is postponed. This provides the advantageous effect that it is possible to prevent the album viewer from knowing that the album user is away from his or her house.

Next, a third embodiment of the present invention will be described. In the third embodiment, the so-called on-line album will be described by way of example. When a user of the on-line album (album user) shoots images using a digital camera, the digital camera automatically transmits the images to the on-line album server. The on-line album server records and manages the received images, and when a viewing request is received from a PC or a cellular phone of a viewer of the on-line album (album viewer), the on-line album server distributes a requested image.

Also in third embodiment, the hardware configuration of the digital camera used by the album user is the same as that of the camera-equipped cellular phone 110 shown in FIG. 1. Further, the hardware configuration of the on-line album server is the same as that of the blog server 120 shown in FIG. 1. The configuration of the PC or the cellular phone of the album viewer is the same as that of the FIG. 1 PC 130 or cellular phone 140 of the written article viewer. Therefore, corresponding components of the digital camera used by the album user (corresponding to the camera-equipped cellular phone 110), the on-line album server (corresponding to the blog server 120), and the PC (corresponding to the PC 130) or the cellular phone (corresponding to the cellular phone 140) of the album viewer are denoted by the same reference numerals, and description thereof is omitted.

In third embodiment, upon shooting an image, the digital camera 110 of the album user receives electric waves from the GPS satellite to thereby acquire location information, and adds the location information to the image. Next, it is determined whether or not the location of the digital camera 110 when an image was shot is within a distribution permitting area set in advance (the same as the distribution permitting area 202 described in the first embodiment). The digital camera 110 transmits information indicating whether or not the location of the digital camera 110 during shooting is within the distribution permitting area (hereinafter referred to as "camera area information") and the shot image to the on-line album server 120.

The on-line album server 120 receives the image and the camera area information, stores the image as an image file, and stores information concerning the received image in the table. FIG. 14 is a diagram showing the configuration of a table for storing information concerning images received by the on-line album server 120. The table, denoted by reference numeral 1400, includes paths 1401 for image files as the addresses of the images, items of camera area information 1402 associated with the respective reimages, and flags 1403 each indicative of whether or not distribution of an associated one of the images is permitted or to be postponed.

Figure 15:
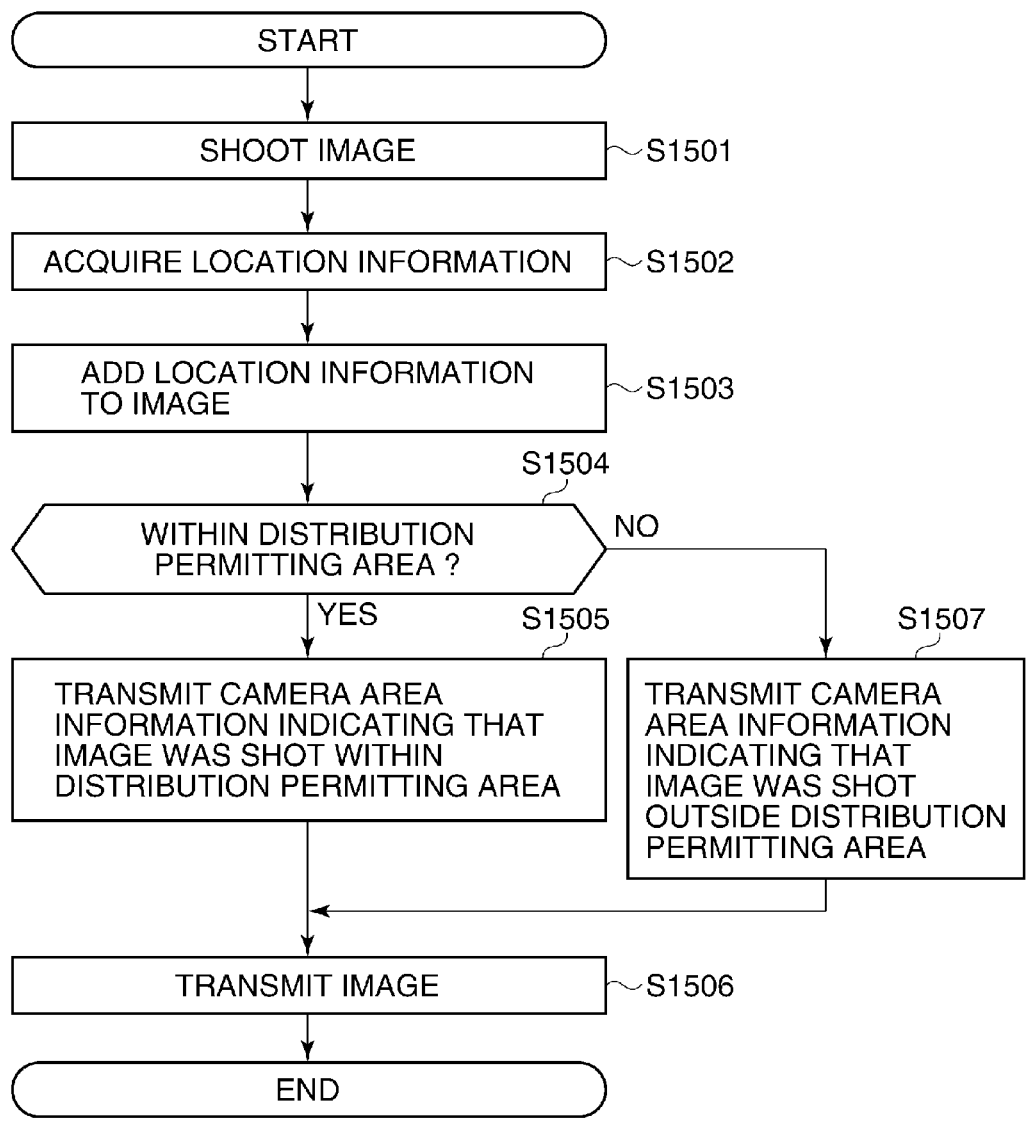
FIG. 15 is a flowchart of a location information image transmission process executed in the image management system shown in FIG. 14 by a digital camera when the digital camera has shot an image.

FIG. 15 is a flowchart of a location information image transmission process executed when a digital camera 110 of the album user has shot an image. When the album user presses a shutter button, not shown, of the digital camera 100, the image shooting section 117 of the digital camera 110 shoots an image (step S1501), and the CPU 111 of digital camera 110 receives electric waves from the GPS satellite to thereby acquire location information (step S1502). Then, the CPU 111 adds the acquired location information to the image (step S1503). Then, the CPU 111 of the digital camera 110 determines whether or not a location indicated by the location information acquired in the step S1502 is within the distribution permitting area (step S1504). The distribution permitting area is set in the digital camera 110 by the album user in advance.

If it is determined that the location indicated by the location information is within the distribution permitting area ("YES" to the step S1504), the digital camera 110 transmits camera area information indicating that the image has been shot within the distribution permitting area, to the on-line album 120 server via the communication section 115 (step S1505). On the other hand, if it is determined that the location indicated by the location information is outside the distribution permitting area ("NO" to the step S1504), the digital camera 110 transmits camera area information indicating that the image has not been shot within the distribution permitting area, to the on-line album server 120 (step S1507). After the step S1505 or 1507, the image associated with the camera area information is transmitted to the on-line album server 120 (step S1506), followed by terminating the present process.

Figure 16:
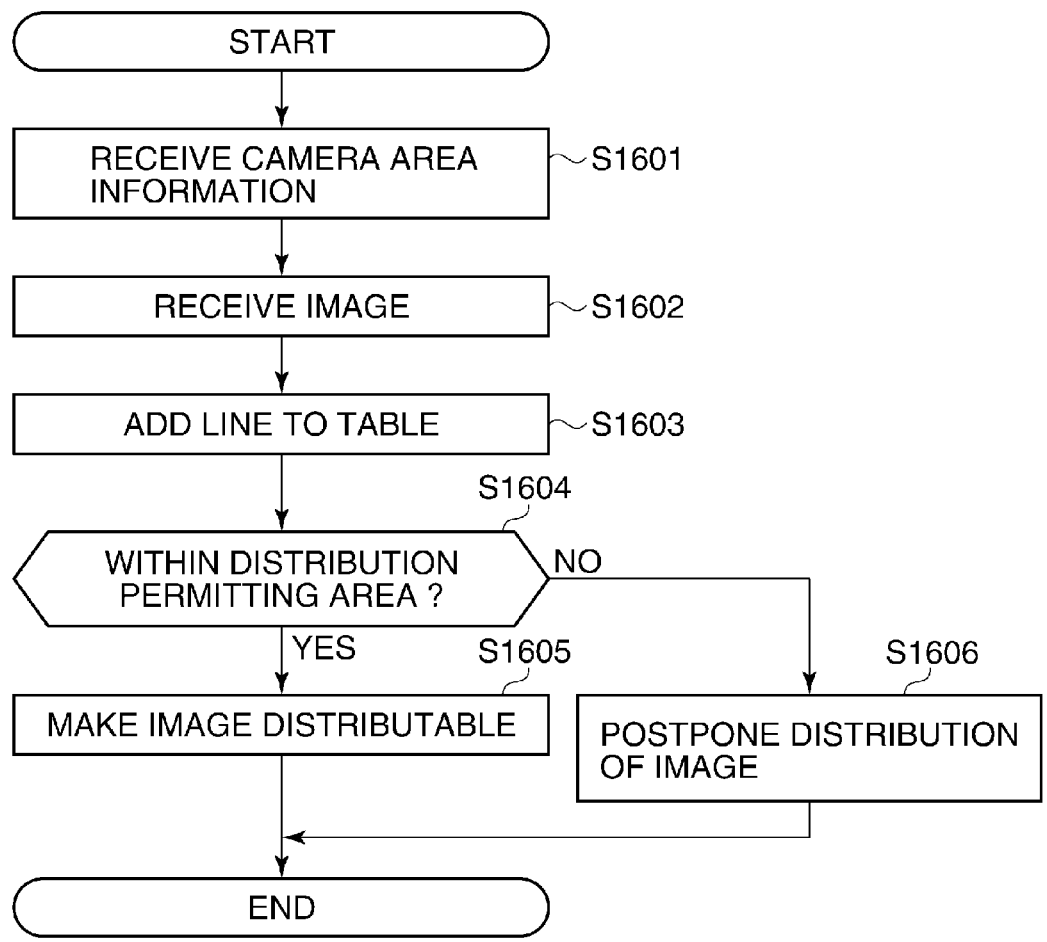
FIG. 16 is a flowchart of a location information & image-receiving process executed in the image management system shown in FIG. 14 by the on-line album server when the on-line album server has received an image or the like from the digital camera.

FIG. 16 is a flowchart of a location information & image-receiving process executed when the on-line album server 120 has received an image or the like from the digital camera 110. The on-line album server 120 receives camera area information, which indicates whether or not an image was shot within the distribution permitting area, in association with a corresponding one of the steps S1505 and 1507, via the network interface 125 (step S1601). Then, the on-line album server receives the image associated with the camera area information received in the step S1601, in association with the step S1506 via the network interface 125 (step S1602).

Next, the on-line album server 120 adds a line associated with the received image to the table 1400 (step S1603). Then, the received camera area information is checked to thereby determine whether or not the shooting location of the digital camera 110 (location where the image was shot thereby) is within the distribution permitting area (step S1604).

If the shooting location is within the distribution permitting area ("YES to the step S1604), the CPU 121 of the on-line album server 120 sets a flag 1403 in a line associated with the image to "Yes" in the table 1400 (step S1605). This makes the image distributable based on a path 1401 for an image file in the line. On the other hand, if the shooting location of the digital camera 110 is outside the distribution permitting area ("NO to the step S1604), the CPU 121 of the on-line album server 120 sets the flag 1403 in the line associated with the image to "No" in the table 1400, and postpones distribution of the image (step S1606). After the step 1605 or 1606, the present process is terminated.

Similarly to the FIG. 5 operation of the camera-equipped cellular phone 110, the digital camera 110 of the album user periodically acquires location information on the digital camera 110, and transmits the location information to the on-line album server 120. Further, similarly to the FIGS. 8 and 9 operations of the blog server 120, when a location indicated by the location information on the digital camera has moved into the distribution permitting area, the CPU 121 of the on-line album server rewrites the flag 1403 from "No" to "Yes", thereby making distributable the image of which distribution was postponed.

When the PC 130 or the cellular phone 140 of the album viewer requests the on-line album server to transmit an image, the on-line album server searches the table 1400 for information concerning the image, and refers to an associated one of the flags 1403. If the associated flag 1403 is "Yes" indicating that the image is being distributed (distribution thereof is permitted), the on-line album server 120 transmits the image to the PC 130 or the cellular phone 140 of the album viewer. On the other hand, if the associated flag 1403 is "No" indicating that distribution of the image has been postponed, the on-line album server 120 transmits an error message or the like indicating the image is not stored, to the PC 130 or the cellular phone 140 of the album viewer. Since this processing is the same as the processing described in the first embodiment with reference to FIG. 10, detailed description thereof is omitted.

Although in the third embodiment, it is assumed that the digital camera 110 of the album user transmits camera area information indicative of whether or not an associated image has been shot within the distribution permitting area, to the on-line album server 120 separately from the image, this is not limitative, but the camera area information or the content of an associated flag determined from the camera area information may be embedded in the header of an image file of the image such that the image file is transmitted to the on-line album server 120.

According to the third embodiment, even when the album user shoots an image at a location away from a specific place during traveling, such as his or her house, and transmits the image to the on-line album server 120, the on-line album server 120 postpones distribution of such an image. This provides the advantageous effect that it is possible to prevent the album viewer from knowing that the album user is away from his or her house.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-154640 filed Jul. 7, 2010, and Japanese Patent Application No. 2011-148112 filed Jul. 4, 2011, which are hereby incorporated by reference herein in their entirety.

What is claimed is:

1. An image distribution apparatus comprising:
an image receiving unit configured to receive an image from an image transmission apparatus where the image is shot in response to an operation by a user, the image having location information added thereto which is indicative of a location where the image transmission apparatus existed when the image was shot;
a storage unit configured to store the image;
a setting unit configured to set a geographical place relevant to the user;
a determination unit configured to determine whether or not a location indicated by the location information added to the image received from the image transmission apparatus is within a predetermined area including the set geographical place relevant to the user; and
a distribution control unit configured to permit distribution of the image via a network if it is determined that the location indicated by the location information is within the predetermined area, and inhibit the distribution of the image if it is determined that the location indicated by the location information is not within the predetermined area, wherein the image distribution apparatus comprises a processor executing a program stored in a memory to implement at least a part of function of at least one of said units.

2. The image distribution apparatus according to claim 1, wherein said distribution control unit permits distribution of the image when a predetermined time period has elapsed even if it is determined that the location indicated by the location information is not within the predetermined area.

3. The image distribution apparatus according to claim 1, further comprising a detection unit configured to detect that the image transmission apparatus has moved into the predetermined area, and
wherein said distribution control unit permits distribution of the image if it is detected that the image transmission apparatus has moved into the predetermined area, even if it is determined that the location indicated by the location information is not within the predetermined area.

4. The image distribution apparatus according to claim 1, further comprising a request-receiving unit configured to receive a request for viewing the image from an information communication apparatus; and
a transmission control unit configured to cause the image to be transmitted to the information communication apparatus if distribution of the image of which viewing is requested is permitted, and cause a message different from the image to be transmitted to the information communication apparatus if distribution of the image of which viewing is requested is inhibited.

5. The image distribution apparatus according to claim 1, wherein said image receiving unit receives a text together with the image, and
wherein said distribution control unit permits distribution of the image and the text via a network if it is determined that the location indicated by the location information is within the predetermined area, and inhibits distribution of the image via the network but permits distribution of the text via the network if it is determined that the location indicated by the location information is not within the predetermined area.

6. The image distribution apparatus according to claim 1, further comprising an area information-receiving unit configured to receive area information indicative of whether or not the location indicated by the location information is within the predetermined area, from the image transmission apparatus, and
wherein said determination unit performs the determination, based on the area information.

7. The image distribution apparatus according to claim 1, wherein said determination unit starts the determination after the image, to which the location information is added, is received by said image receiving unit.

8. An image transmission apparatus, where an image is shot in response to an operation by a user, comprising:
a storage unit configured to store the image, the image having location information added thereto which is indicative of a location where the image transmission apparatus existed when the image was shot;
a setting unit configured to set a geographical place relevant to the user;
a determination unit configured to determine whether or not a location indicated by the location information is within a predetermined area including the set geographical place relevant to the user; and
a transmission control unit configured to cause the image to be transmitted to an image distribution apparatus via a network if it is determined that the location indicated by the location information is within the predetermined area, and cause the image to be prevented from being transmitted to the image distribution apparatus if it is determined that the location indicated by the location information is not within the predetermined area,
wherein the image transmission apparatus comprises a processor executing a program stored in a memory to implement at least a part of function of at least one of said units.

9. The image transmission apparatus according to claim 8, further comprising a detection unit configured to detect that the image transmission apparatus has moved into the predetermined area, and
wherein said transmission control unit causes the image to be transmitted if it is detected that the image transmission apparatus has moved into the predetermined area, even if it is determined that the location indicated by the location information is not within the predetermined area.

10. The image transmission apparatus according to claim 8, wherein said transmission control unit transmits the image when a predetermined time period has elapsed even if it is determined that the location indicated by the location information is not within the predetermined area.

11. The image transmission apparatus according to claim 8, wherein said determination unit starts the determination after said storage unit has stored the image and before said transmission control unit causes the image to be transmitted.

12. A method of controlling an image distribution apparatus, comprising:
receiving an image from an image transmission apparatus where the image is shot in response to an operation by a user, the image having location information added thereto which is indicative of a location where the image transmission apparatus existed when the image was shot;
storing the image;
setting a geographical place relevant to the user;
determining whether or not a location indicated by the location information added to the image received from the image transmission apparatus is within a predetermined area including the set geographical place relevant to the user; and
permitting distribution of the image via a network if it is determined that the location indicated by the location information is within the predetermined area, and inhibiting the distribution of the image if it is determined that the location indicated by the location information is not within the predetermined area.

13. A method of controlling an image transmission apparatus, where an image is shot in response to an operation by a user, comprising:
storing the image, the image having location information added thereto which is indicative of a location where the image transmission apparatus existed when the image was shot;
setting a geographical place relevant to the user;
determining whether or not a location indicated by the location information is within a predetermined area; and
causing the image to be transmitted to an image distribution apparatus via a network if it is determined that the location indicated by the location information is within the predetermined area, and causing the image to be prevented from being transmitted to the image distribution apparatus if it is determined that the location indicated by the location information is not within the predetermined area.

14. A non-transitory computer-readable storage medium storing a computer-executable program for causing a computer to execute a method of controlling an image distribution apparatus, wherein the method comprises:

receiving an image from an image transmission apparatus where the image is shot in response to an operation by a user, the image having location information added thereto which is indicative of a location where the image transmission apparatus existed when the image was shot;

storing the image;

setting a geographical place relevant to the user;

determining whether or not a location indicated by the location information added to the image received from the image transmission apparatus is within a predetermined area including the set geographical place relevant to the user; and permitting distribution of the image via a network if it is determined that the location indicated by the location information is within the predetermined area, and inhibiting the distribution of the image if it is determined that the location indicated by the location information is not within the predetermined area.

15. A non-transitory computer-readable storage medium storing a computer-executable program for causing a computer to execute a method of controlling an image transmission apparatus, where an image is shot in response to an operation by a user, wherein the method comprises:

storing the image, the image having location information added thereto which is indicative of a location where the image transmission apparatus existed when the image was shot;

setting a geographical place relevant to the user;

determining whether or not a location indicated by the location information is within a predetermined area; and causing the image to be transmitted to an image distribution apparatus via a network if it is determined that the location indicated by the location information is within the predetermined area, and causing the image to be prevented from being transmitted to the image distribution apparatus if it is determined that the location indicated by the location information is not within the predetermined area.

* * * * *